United States Patent [19]
Koper

[11] 3,783,294
[45] Jan. 1, 1974

[54] AUTOMATED STEREO-PHOTOGRAMMETRIC INSTRUMENT

[75] Inventor: Robert Koper, Heerbrugg, Switzerland

[73] Assignee: Wild Heerbrugg Limited, Heerbrugg, Switzerland

[22] Filed: May 19, 1972

[21] Appl. No.: 255,231

[52] U.S. Cl. .............................. 250/558, 356/2
[51] Int. Cl. ........................................ G01c 11/12
[58] Field of Search .................. 250/220 SP; 356/2; 178/6.8

[56] References Cited
UNITED STATES PATENTS

| | | | |
|---|---|---|---|
| 3,663,104 | 5/1972 | Godfrey | 356/2 |
| 3,595,995 | 7/1971 | Hobrough | 250/220 SP |
| 3,513,257 | 5/1970 | Hobrough | 250/220 SP |
| 3,432,674 | 3/1969 | Hobrough | 250/220 SP |
| 3,554,645 | 1/1971 | Bertram | 250/220 SP |
| 3,593,286 | 7/1971 | Altman | 178/6.8 |

Primary Examiner—James W. Lawrence
Assistant Examiner—T. N. Grigsby
Attorney—Michael Ebert

[57] ABSTRACT

An automated photogrammetric instrument adapted to observe conjugate areas in a stereo-pair of photographs for the purpose of determining terrain elevation and for carrying out other measurements. In order to measure X-parallax, the instrument includes means to scan each of the photographs along a path in which X-parallax is present, but which is substantially free of Y-parallax and the effects of image rotation, thereby producing first and second video signals representative of the scanned paths in the pair of photographs. The first and second video signals are applied to a correlator to produce an output value reflecting the degree of differential X-parallax.

20 Claims, 11 Drawing Figures

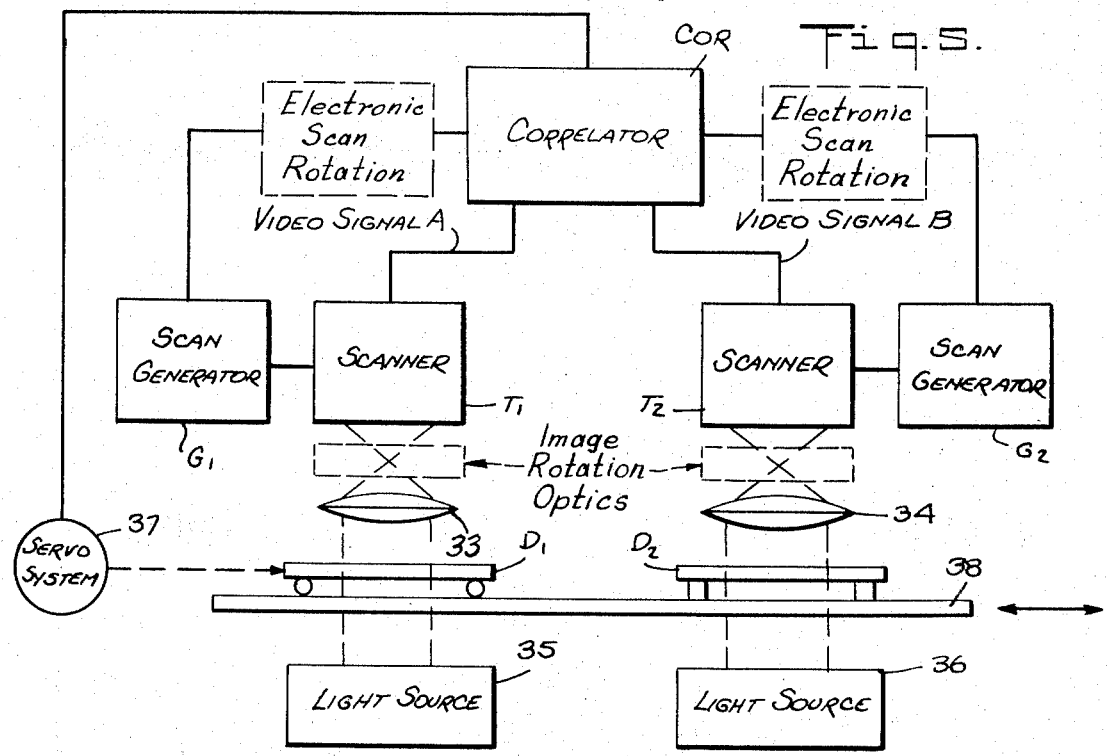
Fig. 5.
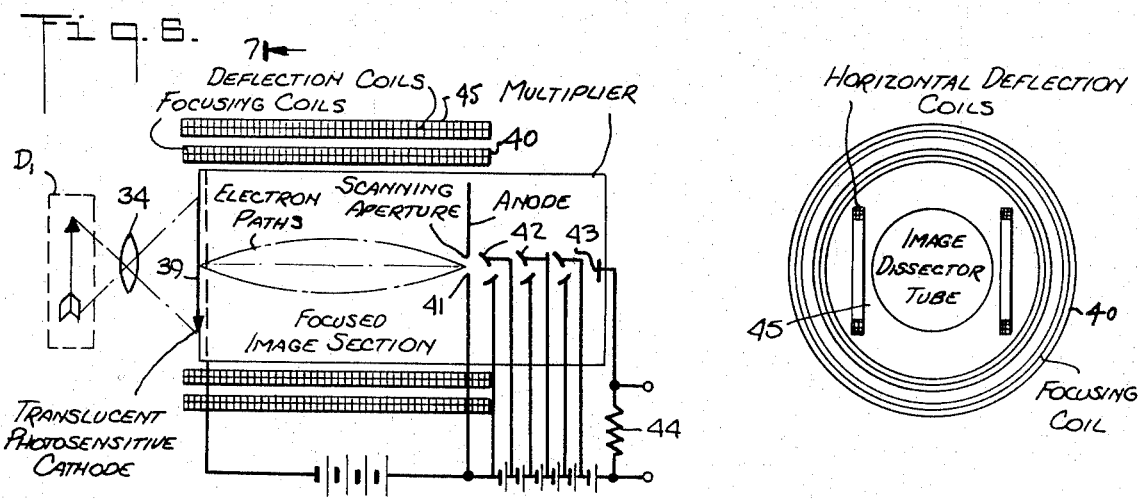
Fig. 6.
Fig. 7.
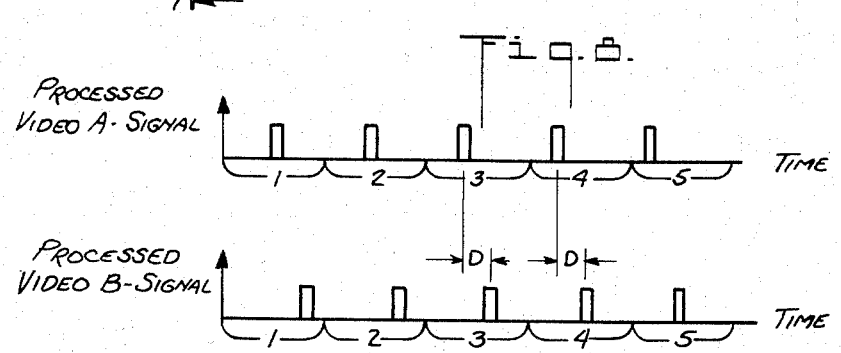
Fig. 8.

AUTOMATED STEREO-PHOTOGRAMMETRIC INSTRUMENT

BACKGROUND OF THE INVENTION

This invention relates generally to photogrammetry, and in particular to automated stereoscopic instruments.

Basic Principles of Stereo-Photogrammetry

Photogrammetry may be defined as that branch of engineering wherein the geometry of a camera and photograph is used to derive measurements of objects appearing in one or more photographs. The present invention is only concerned with a particular technique of photogrammetry, namely the technique of generating an apparent three-dimensional image (called in photogrammetry a stereoscopic model) of the object of interest from photographs. Associated with this stereoscopic model is a geometric model which may exist physically as the surface generated by the intersections of a multitude of optical rays (or simulated rays), or which may exist only as a mathematical abstraction. The geometric model is a representation of the objects of interest at a reduced scale.

Observations are made in the stereoscopic model. When, however, a geometric model exists, the measurements are made therein. If the geometric model exists only as a mathematical obstraction, the measurements are made in the photographs themselves. But for many purposes it is convenient to work with derived measurements in the abstract geometric model.

Almost a hundred years ago, the stereopticon was a popular parlor entertainment device. In the stereopticon a pair of photographs are viewed through a hand-held device whereby each eye sees only one of the two images. The photographs were obtained by taking two separate pictures of the object, the camera being shifted a few inches horizontally between the first and second picture. Special cameras existed for taking the displaced photographs simultaneously. Also, the displacement between the two exposures was sometimes increased to enhance the stereoscopic effect.

The picture made in the leftmost position is presented to the left eye and that from the rightmost position to the right eye. With some practice, the person viewing the pair of pictures through the stereopticon is able to fuse the two images, thereby creating the appearance of a three-dimensional model of the original object or scene photographed.

A similar procedure is employed to generate the stereoscopic modles used in photogrammetry. Th first step is to take aerial photographs of a given area. The photographs are normally taken by an airplane flying at a convenient altitude in an approximately straight line. The photographs are taken at sufficiently close positions (called camera stations) along the flight line so that each individual photograph overlaps those taken immediately before and immediately after. The line joining two consecutive camera stations is called the base. The usual overlap is about 60 percent, and it is only in this area of overlap that stereoscopic and geometric models can be generated, since each point in the model must be represented by two different photographic images.

In order to demonstrate and to study the geometry of the basic photogrammetric problem, a three-dimensional coordinate system is defined as follows:

The origin lies in the center of the base.
The X-axis is horizontal and lies nearly parallel to the base.
The Y-axis is horizontal and perpendicular to the X-axis.
The Z-axis is vertical.

When a pair of stereo-photographs taken in the manner described above is examined in the framework of this coordinate system, several significant facts become evident:

1. Variations in altitude of the terrain (called relief in photogrammetry) result in image displacement in the photograph, the displacement being proportional to the amount of relief and to the distance from the center of the photograph (considering only photographs taken vertically, for the sake of simplicity).
2. The component of relief displacement in the X direction as defined above can be used as a direct measure of the relief of the model generated from the overlapping areas of the photographs.

The geometric construction showing image displacement due to relief and its variation in the two photographs comprising an overlapping pair are shown in any elementary text on photogrammetry. See, for instance, MANUAL OF PHOTOGRAMMETRY, Third Edition, published by American Society of Photogrammetry, The measured variation in image displacement in the X-direction is called "X-parallax" (strictly, differential X-parallax). From this, by techniques well known in photogrammetry, terrain relief and other pertinent cartographic data can be obtained. The present invention deals with a new technique for automatically measuring differential X-parallax by a method optimized to provide the data in the best form for generating from the measurements the desired photogrammetric and cartographic information.

Most of the equipment which has heretofore been constructed for determining X-parallax at known X and Y coordinates in photogrammetric model space has been designed for manual operation and makes use of the ability of the human eye-brain combination to provide the satisfactory fusion and thereby see the stereoscopic model and make measurements in the geometric model related thereto. The measuring technique in the manual system requires control of an optical marker (normally called the "dot" or the "floating mark"). Manipulation of the controls of the equipment moves the apparent relative position of this dot with respect to the stereoscopic model. The stereoscopic and geometric models are generated from two photographs (normally positive transparencies, referred to in photogrammetry as diapositive plates, or simply, the plates).

In order to illustrate the principles of operation, we shall in the following description assume that the plates are moved relative to a fixed dot. It must be understood, however, that it is equally possible to move the dot, or a pair of dots which can be fused by the eye-brain combination into one floating mark, relative to fixed plates. The result is the same.

The two plates can be moved simultaneously, in the viewer's frame of reference, to the left or right (corresponding to the X direction) and forwards or backwards (corresponding to the Y direction). When the two plates are moved to the left (negative X direction), the floating mark appears to move at a constant height through the stereoscopic model to the right. Similarly, if the plates are moved in the negative Y direction, the floating mark appears to move through the model in the positive Y direction, again at constant height.

An additional control is provided in all of these instruments, which moves the plates relative to each other in the X direction, changing the X spacing between the plates in a positive or negative manner and so providing the possibility of eliminating X-parallax in the small area around the floating mark. This motion appears to move the floating mark vertically and can be related mechanically or by computation to an effective Z motion. It is possible to adjust this differential X motion so that the floating mark appears to lie on the surface of the stereoscopic model.

The normal use of such equipment requires that the floating mark be placed on the surface of the stereoscopic model (and therefore on the surface of the related geometric model) by the operator at all points where the X-parallax is to be measured. In cases where it is desired to make a continuous map of the model, X-parallaxes must be eliminated continuously along lines in the geometric model which are to be plotted.

Another technique, which is the one of interest in connection with the present invention, is the technique known as profiling. To profile a geometric model, the floating mark is moved continuously in one direction relative to the model; normally this motion can be in either the X or Y direction. The operator must then continuously eliminate the X-parallax so that the floating mark appears to be continuously following the surface of the stereoscopic model.

In general, systems of this sort have an automatic readout so that a record is obtained of the X, Y and X-parallax (or X, Y and Z) along this entire path. This results in what is called a single profile through the model. After each single profile is generated, the floating mark is then moved in a direction perpendicular to the profiling motion and another profile parallel to the first is obtained in exactly the same manner. The entire model relief is then represented by a series of such profile lines along its surface.

Many attempts have heretofore been made to automate this profiling process. Two principal applications of profiling exist at present, namely: digital terrain models, and the development of so-called "orthophotographs." Digital terrain models are nothing more than the representation of the model relief by XYZ coordinates of discrete points along profiles, as previously discussed.

An orthophotograph is a photographic representation of a terrain surface in which the central projection of the original photograph has been transformed into a close approximation to a parallel, vertical projection, like that of a map. The main information needed to generate an orthophotograph can be derived from profiles made in a geometric model. This information comprises X, Y and Z coordinates and, possibly, the magnitude of the slope of the model surface perpendicular to the profiling direction. The remaining necessary data, including, for example, the angular tilts of the original photograph which is to be transformed into an orthophotograph, is immediately available when the geometric model is formed in which the profiles are to be traced.

Much of the effort expended in prior-art approaches to automation has been exerted to obtain information that is not fundamental to the automatic generation of profiles. In order to automate the process of profiling, it is only necessary to provide a system which will continuously and automatically eliminate X-parallaxes along the line being profiled.

Thus by discarding information that is not essential to the desired measurements, one can bring about a significant simplification in the structure of an automated stereo-photogrammetric instrument. An electronic system in accordance with the present invention is based on this simplified approach to photogrammetric measurement and is not only less complex and faster than existing systems, but is also free of many drawbacks characteristic of existing systems.

Limitations of Existing Automatic
Stereo-Photogrammetric Instruments

Because of limitations inherent in the processing technique employed, existing concepts for automated equipment do not, for the most part, lend themselves to a larger increase in speed. These limitations have to do with the size of the area which must be scanned to establish correlation, the time required to generate an error decision from scanning of this area and utlimately the number of photons which must be gathered in order to provide an acceptable signal-to-noise ratio for making decisions as to the relative position, size, and orientation of two scanned image areas.

In general, existing equipment for automating the generation of profiles acts to examine small areas of a pair of photographs. They do this by a "point scan" technique. That is, they use a relatively small scanning aperture (usually generated as a point of light) and constrain this aperture to overscan the area of interest on the photograph by means of one of several well known area-scan techniques. Such techniques entail either generating a variation of a lissajou pattern by means of a cathode-ray tube, or by noise-modulating the scan pattern.

The attainable speed of any system to make proper decisions is controlled by the signal-to-noise ratio of the information gathered. In a system for scanning images, the signal-to-noise ratio is ultimately limited by the number of photons that can be gathered in a decision time. To increase operating speed, it is necessary to diminish the time needed for each decision. This means that the system must gather more photons per unit time. In general, this can be achieved either by stepping up the effective intensity of the light source, or by increasing the light-gathering ability of the system aperture, as by enlarging the aperture size.

In existing systems, the size of the aperture is effectively limited by the inherent scanning and processing techniques used — techniques in which aperture size cannot be enlarged without degrading system performance. Increasing the intensity of the light source is also not feasible. Most known systems use a flying-spot scanner to generate the scan for examining the photograph. In such known systems, the aperture size is controlled by the size of the spot generated by the scanner. An increase in photon count (that is, in actinic light available from the flying-spot scanner) is achievable only by sacrifice of resolution through an increase in effective aperture size.

The only other technique heretofore available for increasing photon count per unit time requires a system having a much brighter light source, such as an incandescent or xenon arc, the illuminated image being scanned electronically by techniques similar to those developed for television. The practical limitation in this arrangement resides in the fact that the entire photosensitive surface of the TV-type tube is exposed to the image of the illuminated area of interest, and only a small part thereof is examined in any unit time. The total number of photons impinging on the photocathode imposes a strict limitation, for there is a limit to the total number of photoelectrons which is allowed to be generated from the entire photocathode surface, regardless of how small a segment is used at any instant.

As a consequence, existing scanning techniques which use a small aperture to cover a relatively large area of a photograph to provide an area scan are restricted as to the speed at which they can scan. This drawback is overcome in the present invention by a novel method of increasing aperture size, without a concomitant reduction in system resolution.

Existing systems examine the area surrounding the corresponding points on aerial photographs and, from the area scan which is generated by the moving point, they determine— usually by relatively simple analog computation— the X, Y ad the theta displacements (image rotation) as well as distortions between these two images.

The distortions normally of interest are those resulting from scale variation in the X or Y direction, called in photogrammetry "X-anamorph" and "Y-anamorph." The generation of all such information entails relatively complex circuitry and also usually requires the integrqtion of information from several scans. As a result, the processing time is slowed down by the fact that the scan must frequently be allowed to dwell at a given area on the photograph until the necessary integration is completed to compute some of the distortions.

Furthermore, existing systems generally correct each of these computed outputs (i.e., X, Y, and rotational displacements plus anamorphic distortions) by individual servo loops. Normal practice is to make some of these servos relatively slow with respect to the others, so that the zeroing of all of the servo loops is not accomplished simultaneously but rather cumulatively. As a result of this requirement, the complexity of the system is increased and the speed of operation is further degraded. The technique underlying the present invention eliminates the need for some of these corrections and considerably speeds up the servos controlling the rest.

Existing systems must examine relatively large areas of the photographs in order to maintain a good correlation level. The decisions made concerning displacement and anamorph corrections are, therefore, based on an examination of these large areas, and as a result fine details in profiling are lost. This becomes particularly true when relatively low-contrast, or comparatively featureless areas of terrain are examined, for under these circumstances, it is normally necessary for existing systems to scan very large areas of the terrain and make decisions based on integration of the data from these large areas.

The use of an area-scan technique based on moving a relatively fine point over a large area in a predetermined pattern made up of successive lines or of a spiral formation to create a suitable raster requires extremely careful matching of the scan patterns that are projected onto the two plates being examined. In some cases this matching is done by generating a common scan pattern and projecting this by optical means onto the two photographs, thereby avoiding some aspects of the matching problem. This has not proved to be very satisfactory because of the loss of actinic energy and because of the difficulty of closing the electronic servo loop when a common scan pattern is used. Furthermore, it imposes severe constraints on the mechanical and optical layout of the system which makes use of the scanners.

Therefore, in most systems in current use, the more common practice is to generate two separate scans, one for each photograph. Any uncontrolled difference between the two scans with respect to their size and orientation, or in the instantaneous position of the point generating the area scan, results in an apparent displacement or distortion of the image being examined. Thus, the scan patterns themselves must either match to within the tolerances of matching that is required of the system output, or else the internal analog processing circuitry must incorporate means to integrate out the effects of such mismatches. In either case, system complexity and costs are magnified.

Definitions

Throughout this specification, the following terms which appear therein are defined as follows:

Anamorph — scale differences between left and right image elements arising from perspective distortions and terrain slope.

Base — The line joining two air stations, or the length of this line. Also, the distance (at the scale of the geometric model) between adjacent perspective centers as reconstructed in the plotting instrument.

Camera station — The point in space occupied by the camera lens at the moment of exposure; also called air station or exposure station.

Corresponding images — A point or line in one system of points or lines homologous to a point or line in another system. Corresponding image points (sometimes called conjugate points) are the images of the same object point on two or more photographs.

Corresponding rays — The rays from two corresponding image points passing through their respective projection centers and intersecting in the original object point or its representation in the geometric model.

Diapositive — A positive photograph on a transparent medium. The term is generally used to refer to a transparent positive used in a plotting instrument, a projector, or a comparator.

Displacement — Any shift in the position of an image on a photograph which does not alter the perspective characteristics of the photograph (i.e., shift due to tilt of the photograph, scale change in the photograph, and relief of the objects photographed). Relief displacement — Displacement of images radially inward or outward with respect to the photograph nadir, according as the ground objects are, respectively, below or above the elevation of the ground nadir.

Epipoles — In the perspective setup of two photographs (two perspective projections), the points on the planes of the photographs where they are cut by the air base (extended line joining the two perspective centers). In the case of a pair of truly vertical photographs, the epipoles are infinitely distant from the principal points. Epipolar plane — Any plane which contains the epipoles; therefore, any plane containing the air base. Epipolar ray — The line on the plane of a photograph joining the epipole and the image of an object. Also expressed as the trace of an epipolar plane on a photograph.

Floating mark (photogrammetry) — A mark seen as occupying a position in the three-dimensional space of the stereoscopic model from a pair of photographs and used as a reference mark in examining or measuring the geometric model. The mark may be formed (1) by one real mark lying in the projected object space; (2) by two real marks lying in the projected or virtually projected object spaces of the two photographs; (3) by two real marks lying in the planes of the photographs themselves; (4) by two real or virtual marks lying in the image planes of the binocular viewing apparatus.

Geometric model — The reduced-scale model of the terrain in the object space of a photogrammetric plotter formed by the intersections of all pairs of corresponding rays. Also, the mathematical abstraction of the model formed as a set of three-dimensional corrdinates computed from observations of coodinates of image points in the photographs.

Orthopholograph — A photographic copy, prepared from a perspective photograph, in which the displacements of images due to tilt and relief have been removed.

Overlapping pair (photogrammetry) — Two photographs taken at different exposure stations in such a maner that a portion of one photograph shows the same terrain as shown on a portion of the other photograph. This term covers the general case and does not imply that the photographs were taken for stereoscopic examination.

Parallax — The apparent dispalacement of the position of a body, with respect to a reference point or system, caused by a shift in the point of observation. Absolute stereoscopic parallax. — Considering a pair of aerial photographs of equal principal distance, the absolute stereoscopic parallax of a point is the algebraic difference of the distances of the two images from their respective photograph nadirs, measured in a horizontal plane and parallel to the air base. Generally denoted as parallax; also called X parallax, linear parallax, and horizontal parallax. Parallax also is used to denote such measurements, as above, in the plane of a photograph and in the direction of flight. Parallax difference — The difference in the absolute stereoscopic parallaxes of two points imaged on a pair of photographs. Customarily used in the determination of the difference in elevations of objects. Y parallax (photogrammetry)— The difference between the perpendicular distances of the two images of a point from the vertical plane containing the X axis. The existence of y-parallax is an indication of tilt in either one or both photographs and/or a difference in flight height and interferes with stereoscopic examination of the pair.

Stereocomparator (photogrammetry) — A stereoscopic instrument for measuring parallax; usually includes a means of measuring photograph coordinates of image points.

Stereoscopy — The science and art that deals with the use of binocular vision for observation of a pair of overlapping photographs or other perspective views, and with the methods by which such viewing is produced. Stereoscopic pair (photogrammetry) — Two photographs of the same area taken from different camera stations so as to afford stereoscopic vision; frequently called a stereopair. Stereogram — A stereoscopic pair of photographs or drawings correctly oriented and mounted or projected for stereoscopic viewing. Binocular vision — Simultaneous vision with both eyes. Stereoscopic vision — The particular application of binocular vision which enables the observer to obtain the impression of depth, usually by means of two different perspectives of an object (as two photographs taken from different camera stations). Stereoscope— An optical instrument for helping an observer to view photographs, or diagrams, to obtain the mental impression of a three-dimensional model. Stereoscopic fusion — The mental process which combines two perspective views to give an impression of a three-dimensional model. Stereoscopic image — The mental impression of a three-dimensional model which results from viewing two overlapping perspective views. Also called stereoscopic model or stereomodel.

SUMMARY OF INVENTION

In view of the foregoing, it is the main object of this invention to provide a relatively simple instrument for photogrammetric measurement, which obviates or markedly reduces the drawbacks characteristic of existing instruments, and which operates reliably and efficiently to carry out accurate measurement at high speed.

More specifically, an object of this invention is to provide in an automated stereo system, means to scan each photograph in a stereo-pair along a path in which X-parallax is present, but which is substantially free of Y-parallax and image rotation, thereby generating two video signals which, when correlated, produce an output value reflecting the degree of X-parallax.

Yet another object of this invention is to provide an automated stereoscopic instrument of the above type, in which conjugate areas of a stereo pair of photographs are scanned by a simple line scan in the X-direction, thereby eliminating all of the redundant information and errors produced by prior-art scanning methods.

Under ideal photographic conditions in which there are no height variations of the camera stations and no tip or tilt exists, the conjugate imagery lies along straight and parallel lines in two photographs of the stereo-pair. But under practical circumstances, variations in station height, tilt or tip gives rise to systematic errors, corrections for which can be determined by a simple computation. The input data for this computation can be obtained from the standard technique of setting up the diapositives in a stereo plotter so as to eliminate Y parallax, thereby clearing the model. Hence, now that the geometry of the stereo pair can support a straight line scan, extraneous Y and image rotation displacement are not seen and do not adversely affect the correlation process.

Also an object of the invention is to provide a stereoscopic instrument in which scanning is carried out by a pair of deflectable electron multipliers or image dissectors (or a functionally similar solid state scanner such as a chargecoupled detector) using a line scan to derive from conjugate images in the stereo-pair, corresponding electrical signals which are applied to a correlator, the instrument yielding X, Y and Z coordinates along chosen profiles. It is also possible for the instrument to furnish slope in the X-direction.

A significant feature of the invention resides in the fact that a line scan is inherently highly efficient in gathering photons in the actinic region of a deflectable mulitplier, because a relatively large aperture can be used. As a consequence, even at high scanning speeds, the signal-to-noise ratio is favorable.

In a system in accordance with the invention, corresponding images in the stereo-pair of photographs can have differential rotations and scales as a result of tilts of the photographs and by reason of differences in flying height. These rotations and scale differences can be "precalculated" and corrected, in which event no closed-loop servo action is required, as in prior systems.

Because the line scans in epipolar planes which in practice are closely parallel to the X-direction, perspective distortions of the images in the Y-direction have no significance, for they are not seen by the X-directed line scan.

In a system in accordance with the invention, the terrain slope in the X-direction can be derived automatically from the difference of X-scale between the corresponding images that remain after correction has been effected for rotations and scale differences arising from tilts and differences in the height of camera stations.

Inasmuch as only X-parallaxes and slope in the X-direction are sensed, processing speed can be greatly accelerated. Moreover, no integration time is required to control any other servo.

Briefly stated, these objects are attained in one preferred embodiment of an automated stereo-photogrammetric system adapted to observe conjugate areas in a pair of diapositives (or photographs in other forms, such as negatives) for the purpose of determining terrain elevation and for carrying out other photogrammetric operations, the system including first and second image-dissector tubes each associated with a respective diapositive. Each tube is provided with a magnetic deflection coil adapted to deflect the electron trajectory between a photocathode and a defining aperture in an anode in a given direction.

First and second sweep voltage generators are provided which are coupled to respective deflection coils of the first and second dissector tubes to produce single-line scanning patterns whereby the first tube produces a first video signal representative of the varying photographic densities of one of said diapositives in a scanned path, and the second tube produces a second video signal representative of the varying photographic densities of the other diapositive in a corresponding scanned path.

An electron correlator which is responsive to the first and second video signals, functions to produce an output value reflecting the degree of similarity, X-displacement and X-scale difference between the video signals. These output values are used to modify the sweep voltage produced by at least one of said generators to an extent causing the first and second video signals to approach a state of identicality.

The correlator is constituted by a coarse control section and a fine control section. The coarse control section is provided with two separate channels responsive to the respective video signals, each including a low-frequency band-pass filter and a signal processor, the signal processors of the coarse control channels being coupled to a full-scan signal processor producing a coarse anamorph error signal and a coarse displacement error signal. The fine control section is provided with two separate channels responsive to the respective video signals, each including a high-frequency band-pass filter and a signal processor, the signal processors of the fine control channels being coupled to a high-resolution signal processor yielding a fine anamorph error signal and a fine displacement error signal.

Also provided is a summing amplifier having three inputs, one of which is the integrated value of the coarse anamorph error signal, the second of which is the integrated value of the fine anamorph error signal, the third of which is the integrated value of the fine displacement error signal. The summing amplifier produces a modifying voltage which is applied to one of the sweep generators to provide a higher order of correction to effect identicality.

Electronic switching means are provided to render the fine control section of the correlator effective only for a small portion of the full scan, the switching means having manual controls to select the position and width of the effective small portion.

OUTLINE OF DRAWINGS

For a better understanding of the invention, as well as other objects and further features thereof, reference is made to the following detailed description to be read in conjunction with the annexed drawings, wherein.

Figure 3:
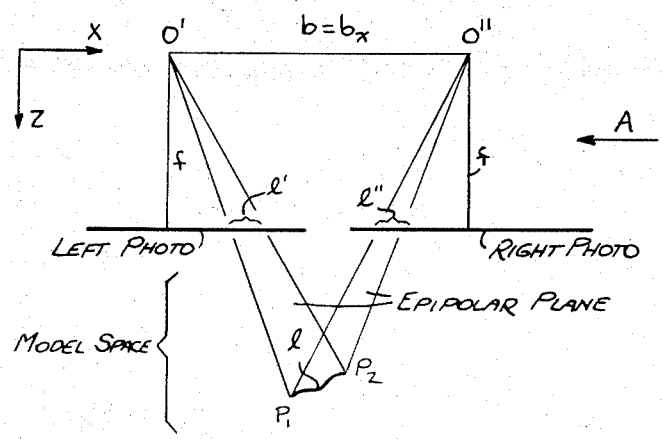
Figure 11:
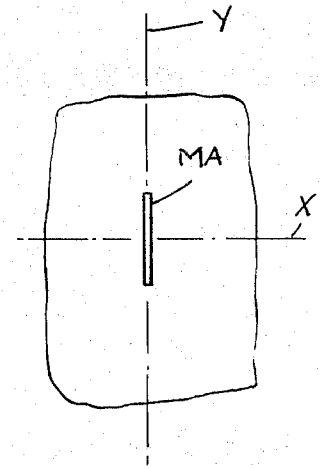
Figure 4:
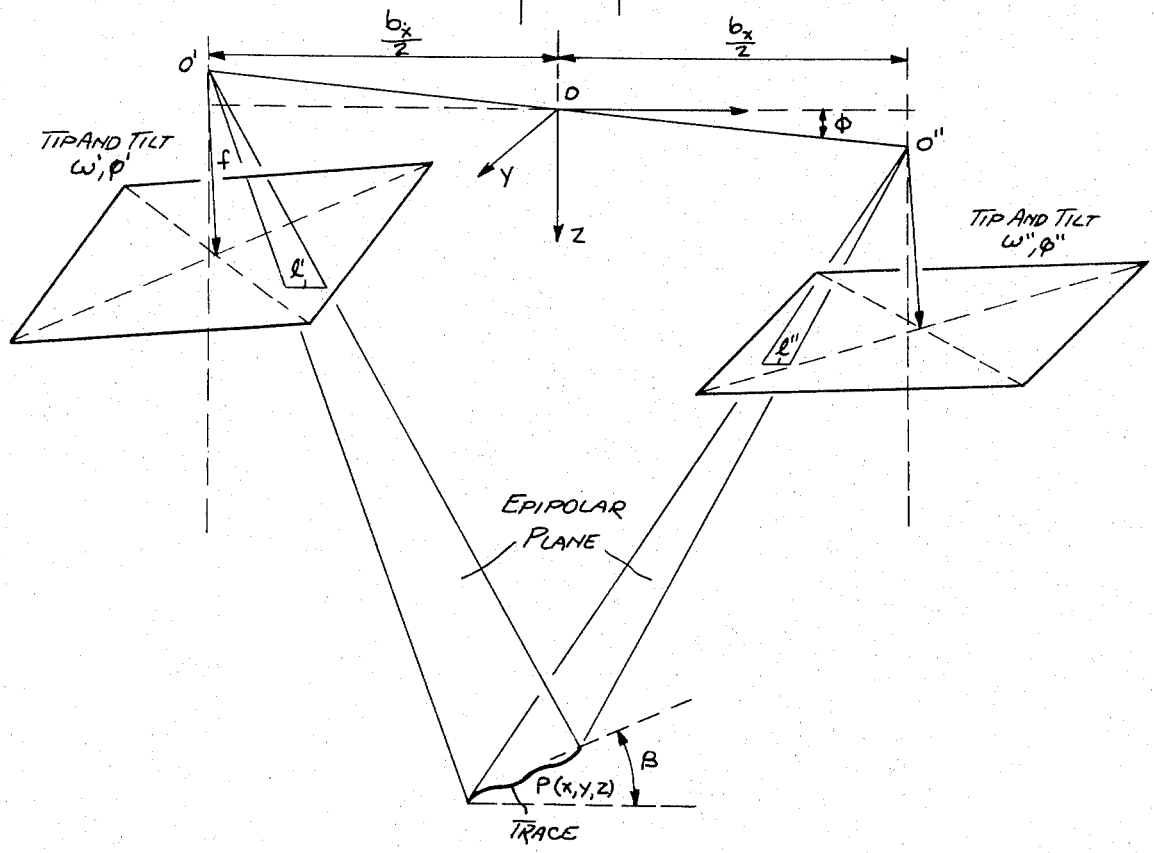
Figure 9:
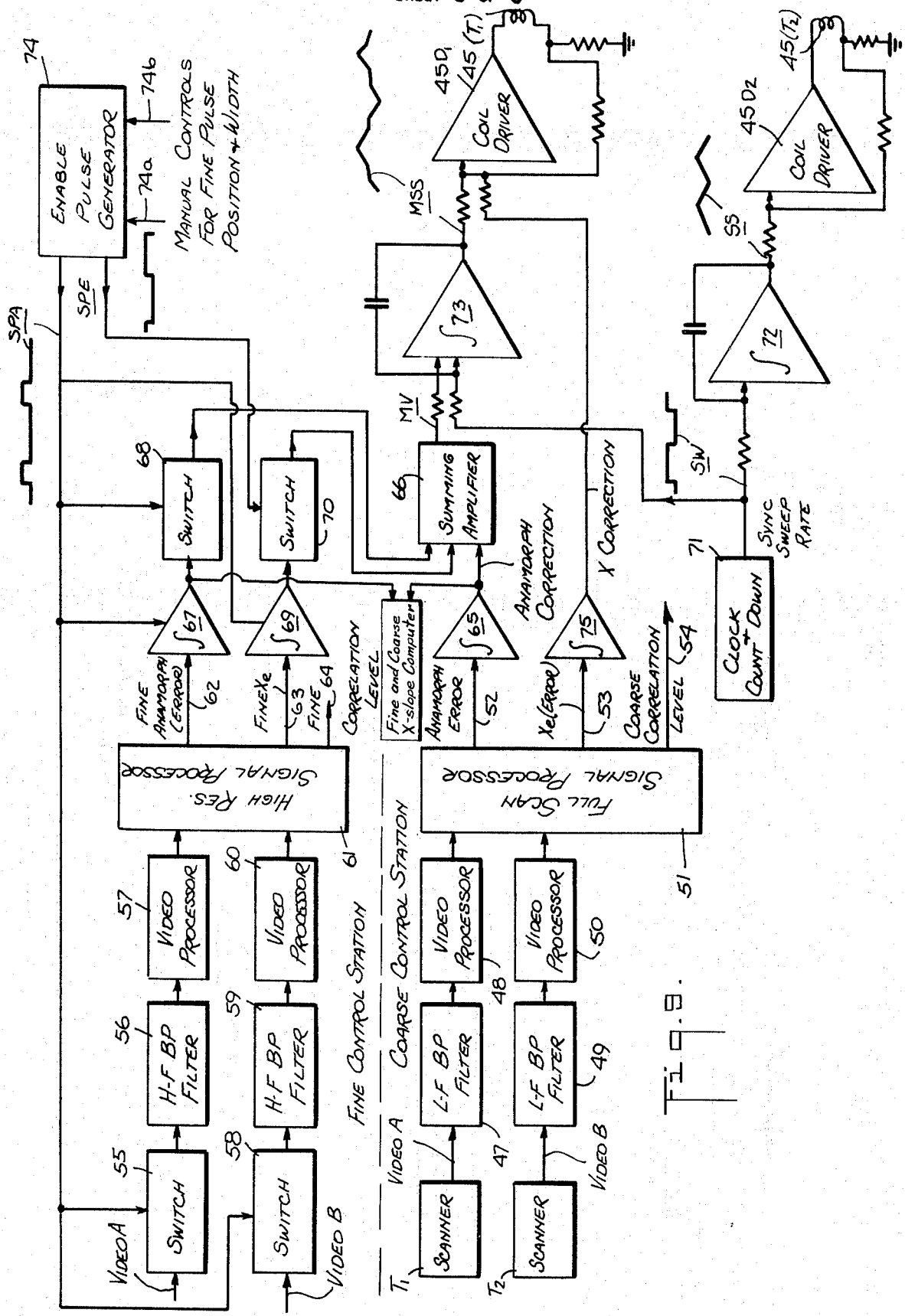
Figure 10:
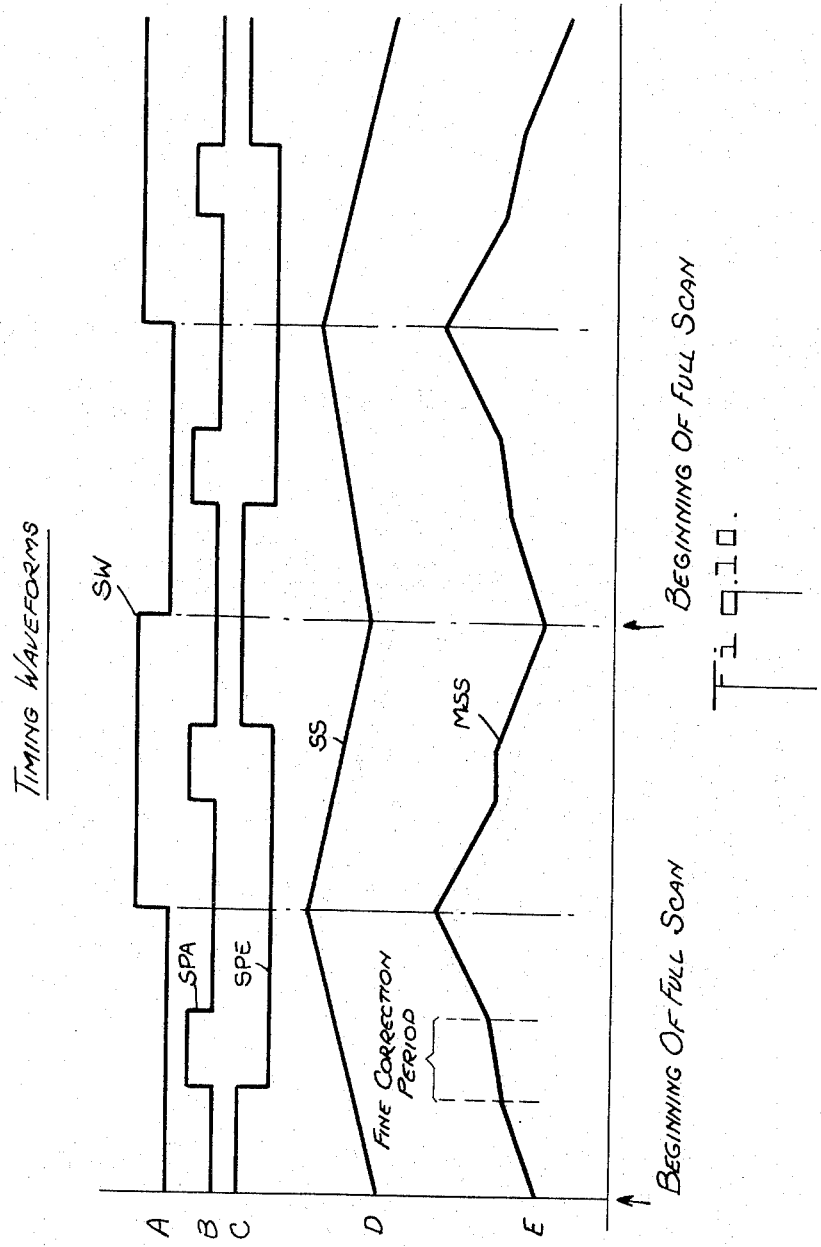

FIG. 3 graphically represents certain terrain details;

FIG. 4 is a graphical representation of anamorphic distortion encountered in stereo images;

FIG. 5 is a simplified block diagram of an automated stereo-photogrammetric system in accordance with the invention;

FIG. 6 schematically illustrates in longitudinal section an image dissector tube of the type functioning as the scanner in the automated system;

FIG. 7 is a transverse section taken in the plane indicated by line 7—7 in FIG. 6;

FIG. 8 graphically represents processed video signals derived from a pair of scanners viewing a stereo pair;

FIG. 9 is a block diagram of the correlator included in the automated system;

FIG. 10 are wave forms representing the voltages produced at various points in the correlator shown in FIG. 9; and FIG. 11 shows a scanning aperture.

DESCRIPTION OF THE INVENTION

Before considering the structure and operation of an automated stereoscopic instrument in accordance with the invention, we shall first analyze the nature of the distortions that arise in an aerial photograph of the terrain, and show how relief displacements present themselves in the photograph which is to be processed photogrammetrically.

Figure 1:
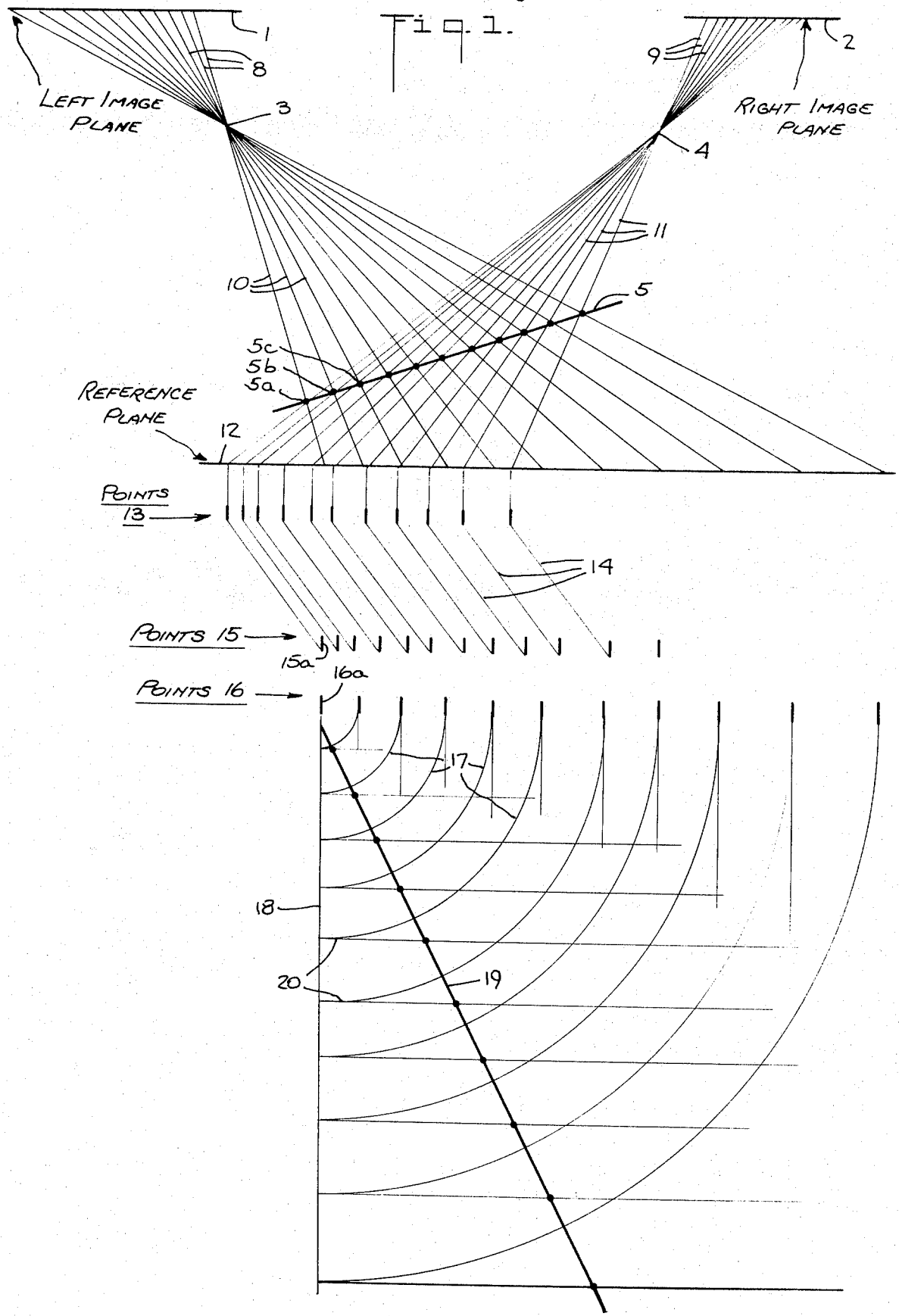
FIG. 1 illustrates the geometric relationship between two aerial camera stations and a terrain to produce a stereo-pair of photographs, the terrain being represented by a simple inclined plane.

FIG. 1 is a highly simplified and idealized version of what happens when a photograph of an inclined plane 5 is taken by two aerial cameras giving overlapping coverage that includes this plane. To avoid complications, it is assumed that the cameras afford ideal projections whose projection centers are at points 3 and 4. The entire image plane is not shown, but merely that portion intersected by rays going from inclined plane 5 through projection centers 3 and 4.

For simplicity, equally-spaced points of information 5a, 5b, 5c, etc., have been marked off along inclined plane 5. Two distinct sets of projections exist, the first being constituted by rays 10 extending from the several points of information (5a, 5b, etc.) on plane 5, the rays passing through projection center 3 and continuing as projection rays 8 which impinge on the left image plane 1.

THe second set of projections is constituted by rays 11 starting from the same points of information on plane 5, and extending through projection center 4, these rays continuing as projection rays 9 which impinge on the right image plane 2. Each set of rays has been extended downwardly through the information points on inclined plane 5 until they strike a reference plane 12 which is placed below inclined plane 5.

For our first analysis, which will later be generalized, we have chosen a configuration that has been simplified by placing both cameras at exactly the same height above reference plane 12, whereby image planes 1 and 2 are co-planar and lie in parallel relation to reference plane 12. We shall consider only projections which lie on a plane defined by the vertical axes of the two cameras. The intersection of this plane with any reference plane, such as reference plane 12, defines the X-axis of the simplified system.

In examining FIG. 1, it will be seen that the projections of inclined plane 5 on horizontally-displaced image planes 1 and 2 are appreciably different. It can also be seen that by the use of similar triangular projections, the images on image planes 1 and 2 appear as magnified projections on reference plane 12, the ratios of the two images being preserved.

Consequently, the images generated at image planes 1 and 2 may be examined in an enlarged scale on reference plane 12. In reference plane 12, the set of points 16 represents the intersection of rays 10 therewith, whereas the set of points 13 represents the intersection of rays 11 therewith.

When a section of model, such as that represented by inclined plane 5 in FIG. 1, is viewed through standard stereoscopic photogrammetric equipment, the operator must determine the altitude, in reference to plane 12, of each of the points 5a, 5b, 5c, etc., along plane 5 which lie at the intersections of the rays of ray sets 10 and 11. This is accomplished by the operator on a point-by-point basis by means of the floating-mark technique previously described.

To solve the same problem with a correlator requires a different approach, for the correlator will generally scan a relatively large area of the model or, to be more specific, it will scan a large section in each of the photographs representing the portion of the terrain being modeled. In order for the correlator to operate properly, the information which is derived from one photograph must be similar (ideally identical) to the information derived from the other photograph.

In photogrammetric instruments, to examine the imagery resulting from photographing inclined plane 5 shown in FIG. 1, the information generated is that which would be developed by scanning both image plane 1 and image plane 2. But as can be seen by their projections 13 and 16, the information taken from image plane 1 is appreciably different from that taken from image plane 2.

One can compensate for the displacement graphically by projecting the points of intersection 13 in reference plane 12 through projection rays 14, to a laterally translated set of points 15. The extent of translation is such that the first point 15a in set 15 is precisely aligned with the first point 16a in set 16, which represents the points of intersection of rays 11 and reference plane 12.

There is still, however, a very great discrepancy between the information being scanned in the point sets 15 and 16, even though as a result of translation the sets start at the same position. It can easily be shown that with the constraints that have been imposed for this projection, that the differences between set 16 and set 15 are strictly a matter of scale.

We therefore rotate the set of points 16 90° about its leftmost point 16a by projecting a circular arc 17 from each point in the set (other than point 16a) to the vertical line 18. Then by projecting horizontally along lines 20 point-by-point from vertical line 18, and vertically point-by-point from translated set 15, we find that the intersections of these horizontal and vertical point projections define an inclined straight line 19.

Thus in the simplified relief situation shown in FIG. 1, wherein the relief consists of a single inclined plane 5 to be examined, effective identicality can be achieved (at least in an idealized case) by a simple translation and scale change of the information generated by scanning the corresponding images on the two photographs forming the stereoscopic model.

Figure 2:
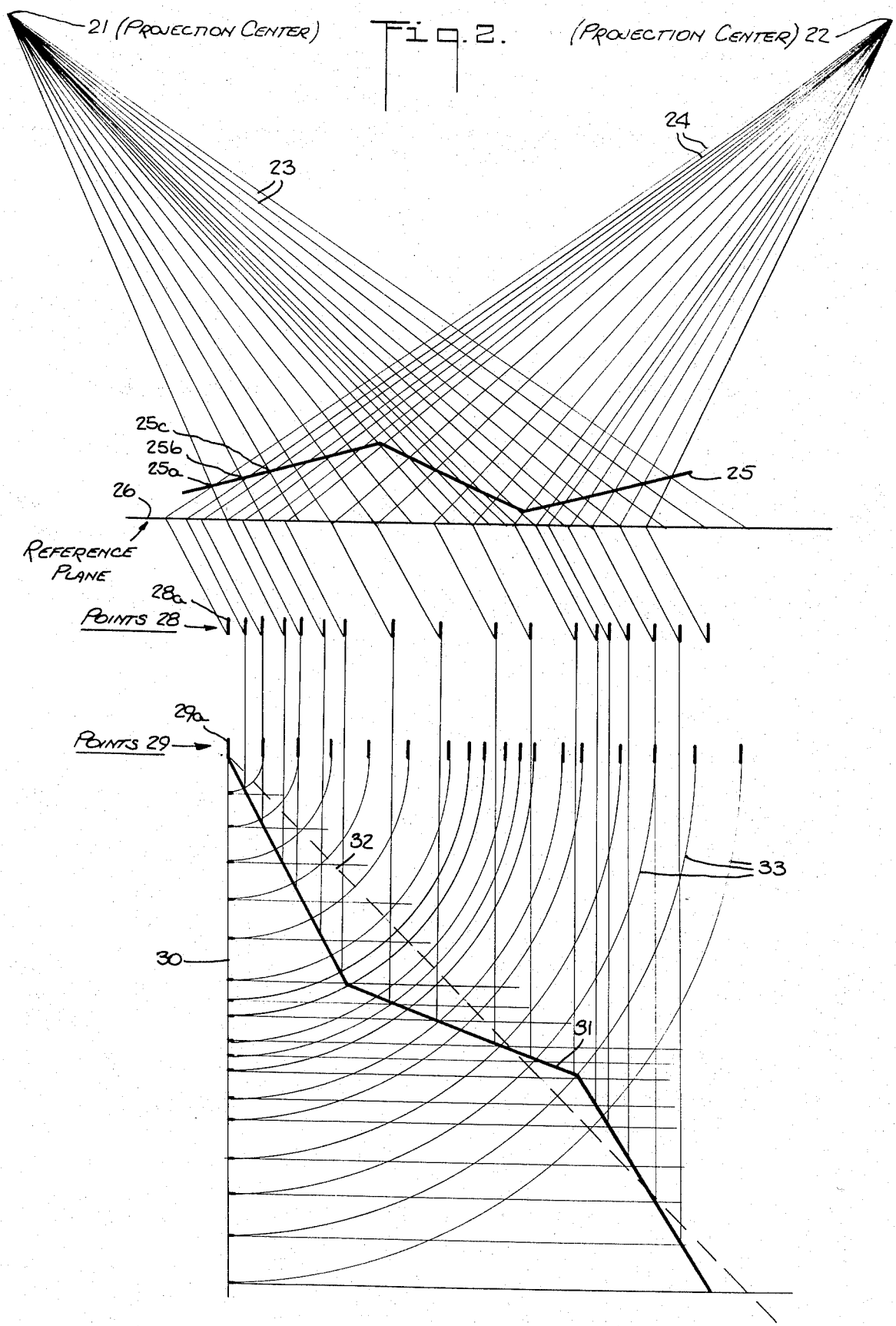
FIG. 2 illustrates the same geometric relationship as FIG. 1, but in this instance the terrain formation is somewhat more complex.

Referring now to FIG. 2, we shall examine a situation in which the same constraints on the camera positions and orientation with respect to the reference plane are maintained as in FIG. 1, but the relief in this instance consists of three intersecting planes producing the sawtooth cross-section 25.

We have shown in connection with FIG. 1 that the information at the horizontally displaced image planes 1 and 2 may be reproduced in a larger and more visible scale on the reference plane 12. We have therefore, in FIG. 2, omitted the image planes from the projection and have illustrated only the reference plane 26.

Using exactly the same projection construction as in FIG. 1, we project from projection center 21 a set of rays 23 which pass through points 25a, 25b, etc. of sawtooth cross-section 25 and impinge on reference plane 26. Similarly, from projection center 22 we project rays 24 through exactly the same points 25a, 25b, etc. on sawtooth cross-section 25 onto reference plane 26.

The set of points 29 are the points where left-image rays 23 impinge on reference plane 26, and the set of points 28 is the translated set of the points where right-image rays 24 impinge on reference plane 26, the translation being such as to precisely align the position of the first point 28a with the first point 29a. The projection from reference plane 26 to the set of points 28 is effected by rays 27.

Now if we rotate by 90° the points of set 29 about its first point 29a through arcs 33 to vertical line 30, and then project horizontally from the points on vertical line 30 to meet projections extending vertically from the set of points 28, using the same technique for this purpose as in FIG. 1, we find that the locus of the intersections consists of a sawtooth line 31. This is to be expected because of the sawtooth cross-section 25 being analyzed.

The present invention employs a novel technique for scanning the photographic plates forming the stereoscopic model. The scan pattern consists of a simple line scan which is parallel to the X-axis. Thus in the simplified situation illustrated in FIG. 1, the scanning pattern will be along the projection of plane 5 appearing on image planes 1 and 2, and shown in an enlarged scale on reference plane 12. It will be evident from examining the projection that after lateral translation has been effected by projection rays 14, that the scale differences between the sets of points 15 and 16 must be corrected by the scanning technique if the resulting signals are to be effectively identical.

The magnitude of the required correction is a direct measure of the slope of inclined plane 5 in the X-direction. In a system in accordance with the present invention, this factor is exploited, for one of the outputs of the system represents the magnitude of the scale change correction. From this output, the slope in the X-direction can be determined.

When we examine FIG. 2, we find that the locus of the scale differences between the set of points 29 derived from one of the images, when rotated 90° into vertical line 30, and the set of translated points 28 derived from the other image, is a sawtooth line segment 31. In order for the two scanners examining the information represented by the point sets 28 and 29 to generate the same output, it is necessary to change the scale on at least one of the scans in a manner which causes it to precisely follow the sawtooth line segment 31.

To provide a reference, a line 32 is drawn in FIG. 2 at a slope of 45° extending from point 29a, about which the set of points 29 is rotated, relative to vertical line 30. This would be the locus generated by the points in vertical plane 30 projected horizontally into vertical projections from points 28, by the method used in FIGS. 1 and 2, if the positions of both points 29 and points 28 were identical.

The departure of line segment 31 from this straight line at a 45° slope, as represented by line 32, indicates the corrections that have to be made to the difference in scale at each point of the two scans examining the information of point sets 28 and 29 in order that the output from scanning these two images be identical.

The purpose of a system in accordance with the present invention is to employ a single line pattern to effect the scan corrections required for a terrain as convoluted or complex as that represented by cross-section 25, in a manner giving rise to substantially identical video outputs by scanning the images appearing on the photographs providing overlapping coverage of the terrain of interest.

We must now consider whether the same analysis can be used if one is faced with an actual photogrammetric situation wherein the simplified conditions adopted in FIGS. 1 and 2 are removed. For this purpose, we shall consider a completely arbitrary situation in which the only constraints are those encountered as practical limitations in acceptable aerial mapping photography.

In the following analysis, we will demonstrate that variations from parallelism of the three planes involved (the two image planes and the reference plane) and the variation in distance between the two image planes and the reference plane give rise to simple image rotation and differences of scale whose values are readily calculable.

Moreover, the present invention can use these calculated values as corrections on the position of the plates so as to eliminate the image rotation and scale differences resulting from the said nonparallelism and variations in the height of the camera stations, so that the results of the preceding simplified analysis are shown to apply.

No other change in imagery in the aerial photographs is encountered; hence no additional scan-processing techniques for the line scan beyond those required for the simplified conditions set forth in connection with FIGS. 1 and 2, are necessary if the systematic rotation and scale corrections are calculated and compensated for by an open-loop compensation system.

It will be shown that these corrections can be calculated by a simple analog or digital computer requiring as inputs only (I) such information as that generated in the relative and absolute orientation of the model when the plates are prepared for examination in the photogrammetric instrument, and (II) the model coordinates of the points represented by the floating mark.

By "relative orientation" is meant the process of removing Y parallax throughout the stereo model. This is normally accomplished by a predetermined procedure employing the five meaningful degrees of freedom available in the stereo viewing equipment. The result of this process is that the two photographic plates are placed in the same relative positions and attitudes as they were when the photographs were originally taken (also known as "clearing the model").

By "absolute orientation" is meant the process of rotating and scaling the geometric model so that it fits to known control points. In this process, the photographic plates are rotated and shifted without disturbing their relative orientation. After absolute orientation, the photographic plates are in the same absolute positions and attitudes at reduced scale as they were when the photographs were originally taken.

Using these corrections for a single line pattern requires that imagery which appears along a straight line in one photograph also appears in a straight line in the other photograph. This will now be demonstrated.

If in FIG. 3 we chose an arbitrary element lying in an epipolar plane. This element projects into the left photograph as a straight line in the X-direction and the element also projects into the right photograph as a straight line extending in the X-direction.

An epipolar plane is defined by the two projection centers O' and O'', and an arbitrary terrain point, such as $P_1$. In the figure, an epipolar plane is shown in a simplified case in which the base lies in the X-axis. In FIG. 3, the terrain detail 1 is imaged in the left photo along a straight line 1' which is the intersection of the epipolar plane with the plane of the photo. The same information is imaged in the right photo as 1'' which is also a straight line along the intersection of the epipolar plane with the plane of the photo.

In FIG. 3, the characters therein designate the following elements and geometric terms:

1: element of the terrain surface and epipolar plane
1': left-hand image element (straight line)
1'': right-hand image element (straight line)
$b = b_x$: base (distance between projection centers O' and O'')
$P_1, P_2$: end points of element
F: focal length.

It will be apparent that the introduction of tip and tilt in the left and right photographs will change the length of the image elements 1' and 1', as well as their direction. Inasmuch as tip and tilt are normally different for the left and right photographs, elements 1' and 1'' will no longer lie parallel to each other. The base element $b_z$ which correspond to a common tip $\Phi$, and $b_y$ will also affect the length and direction of 1' and 1''.

The general mathematical problem can be defined as:

The projection of the intersection of an epipolar plane and the model surface into the left and right image planes in which the most general assumptions concerning tip and tilt and XYZ components of the base are made.

To simplify the presentation of the concepts, the base component $b_y$ (parallel to the Y-axis) is assumed to be zero in the following treatment, for this component can be eliminated or nearly eliminated in many photogrammetric applications. In the most general case, however, its effect can be taken into account in the same way as the other parameters.

The parameters involved in the mathematical formulations are then:

$\left.\begin{array}{l}X\\Y\\Z\end{array}\right\}$ model coordinates of the center points of the element of the trace $\left.\begin{array}{l}b_x\\b_z\end{array}\right\}$ base components parallel to the X- and Y-axes $\Phi$ common tip (a function of $b_z$ and $b_y$)

$\left.\begin{array}{l}\phi'\\\omega'\end{array}\right\}$ tip and tilt of left photo $\left.\begin{array}{l}\phi''\\\omega''\end{array}\right\}$ tip and tilt of right photo $\Bigg\}$ orientation elements $\beta$ = terrain slope defined as the angle between the element and the horizontal line which is the perpendicular projection of the element into the XY plane, projected perpendicularly into the XZ plane.

It is also assumed that the tip and tilt are small (as is the case in all practical photogrammetry today). The following approximate equations for the angles $\alpha'$ (left image element and $\alpha''$ (right image element) can then be derived;

$$\alpha' \approx \frac{-\frac{Y}{Z}\left(\Phi - \frac{\Phi + \varphi'}{1 + \frac{b_x}{2Z} \cdot \Phi}\right)}{1 - \frac{Y}{Z}\left(\Phi - \frac{\omega'}{1 + \frac{b_x}{2Z} \cdot \Phi}\right)}$$

$$\alpha'' \approx \frac{-\frac{Y}{Z}\left(\Phi - \frac{\Phi + \varphi''}{1 - \frac{b_x}{2Z} \cdot \Phi}\right)}{1 - \frac{Y}{Z}\left(\Phi - \frac{\omega''}{1 - \frac{b_x}{2Z} \cdot \Phi}\right)}$$

These angles are the angles between the X-axis and the traces of the epipolar plane and the two image planes. These traces are the epipolar rays.

An examination of these equations shows that the angles $\alpha'$ and $\alpha''$ will, in practice, never exceed a few degrees and therefore the required image elements and the associated line scans will always lie in a direction close to the X direction.

It will be seen that the angles $\alpha'$ and $\alpha''$ are different from each other and therefore in a correlator system using a single line scanning pattern, the line scans must be separately rotated in order to scan the same details in the left and right photographs. Also, the angles $\alpha'$ and $\alpha''$ are independent of the terrain slope $\beta$.

Thus, it is apparent that the required rotations $\alpha'$ and $\alpha''$ can be computed, either by an analog or a digital computer, to any required degree of accuracy, and applied as electrical or optical corrections to appropriately rotate the images or the scans.

A similar type of analysis can be made to determine the ratio, later called X anamorph, of the two lengths 1' and 1'' in the photographs. This analysis shows, as is obvious from FIG. 4, that this ratio is a function of the orientation elements and of the terrain slope $\beta$. The ratio of the lengths can always be computed as a function of the orientation elements and model coordinates for the case $\beta = 0$, and applied as a correction similarly to the rotation correction described above. After this correction has been made, any residual difference of the lengths 1' and 1'' is obviously a function of the terrain slope $\beta$. The correlator in accordance with the present invention can automatically detect this residual difference and thereby give an output which is a function of the terrain slope $\beta$ at any point.

Referring now to FIG. 5, the basic elements of an automated stereo system in accordance with the invention are shown in simplified block diagram form. The system includes a pair of electronic scanners, preferably in the form of image dissector tubes $T_1$ and $T_2$ whose outputs (video signals A and B) are fed to an electronic correlator COR. Though image dissectors are disclosed herein, it is to be understood that other known types of scanners may be used in lieu thereof, such as charge-coupled detectors and vidicon tubes.

Overlapping images appearing on a stereo pair of diapositives $D_1$ and $D_2$ produced by taking aerial photographs, are projected by suitable lens assemblies 33 and 34 onto the sensitive photocathodes of the respective tubes. These images are illuminated by light sources 35 and 36 having sufficient intensity to provide video signals of good signal-to-noise ratio. Scanning tubes $T_1$ and $T_2$ are driven by sweep generators $G_1$ and $G_2$, which are controlled by correlator COR to produce the desired scanning action.

In all automated stereo instruments, the technique employed in measuring terrain elevation involves the determination of the amount of X-parallax by electronic means without the intervention of a human operator. Two fundamental processes are entailed, the first being the conversion of pictorial information from the stereo pair ($D_1$ and $D_2$) into corresponding video signals (this can be effected by mechanical or electronic scanning means).

The second is a comparison of these video signals in a correlator circuit whose function is to ascertain the degree of similarity between the two video signals representing the images on the stereo pair. The less disparity between the images, the better the correlation therebetween.

From video information supplied to correlator COR, displacement and anamorph correction signals are generated which control sweep generators $G_1$ and $G_2$ serving to drive image dissector tubes $T_1$ and $T_2$. A correlator, according to the invention, can be adapted to effect both low order (coarse) and high order (fine) correction.

The correlation process gives rise to signals which, when properly interpreted and employed, cause the video signals derived from the scanned stereo images to approach a condition at which they are nearly identical to a degree within the capability of low order correction. That is to say, low order correction brings about gross scale and position correction such as are required in the example previously given in connection with the stereo pair illustrated in FIG. 1.

But for the more complex relief situation illustrated in FIG. 2, a higher order of correction is called for, this being the function of "fine" correction circuits included in correlator COR. In making the coarse correction, the correlator can act in the usual manner, through an appropriate servo system 37 to shift the position of diapositive $D_1$ relative to diapositive $D_2$ in a direction and to an extent minimizing X- parallax therebetween. In practice, the diapositives (or other forms of photographs) may be supported on a common carriage 38 or on separate carriages. In the latter event, the separate carriages are linked to a common actuator movable in the X- Y- and Z- directions.

FIGS. 6 and 7 schematically show the essential components of the image dissector tubes ($T_1$ or $T_2$) which scan the diapositives to generate video signals. In a tube of this type, a light image derived say from illuminated diapositive $D_1$ is focused onto a photocathode which is followed by an electron-optical focusing section forming an electron image of the emitted photoelectrons in the plane of a small defining aperture. Operatively associated with this aperture is an electron multiplier. A deflection system is provided to deflect the electron image in the defining aperture plane in a manner whereby various portions of the image are examined in a desired sequence.

The diapositive image to be observed by the dissector tube is projected by lens 33 onto photocathode 39 which is a semi-transparent or translucent layer. An electron lens including focusing coil 40, acts to form a sharply defined electron image of the photocathode surface on the plane of an anode having a small defining aperture 41 therein. Because of the sharp focusing action of the electron lens, the defining aperture, in turn, defines a small limited area in the photocathode from which signal and dark noise can originate. All remaining photocathode signal and noise are effectively eliminated.

The small photocathode area which is effective at any instant in time is called the instantaneous effective photocathode area and is referred to in terms of the instantaneous effective photocathode dimension or "IEPD." Following the defining aperture 41 is the electron multiplier stage having a series of dynodes 42 and a collector 43 to produce an amplified signal which may be developed across the load resistor 44. The gain can be on the order of $10^{+7}$ or more, depending on the applied voltage and is sufficient so that amplifier, load resistance and other external noise sources can usually be made negligible.

Horizontal deflection coils 45 surround the image section of the tube, making it possible to deflect the electron trajectories between photocathode 39 and defining aperture 41, thereby providing an operational horizontal scan. Inasmuch as scanning is in one direction only, no need exists for vertical deflection means. While magnetic deflection means have been illustrated, one may obtain equivalent effects with electrostatic deflection means. stereo-photogrammetic Before considering the particular form of correlator COR used in conjunction with image dissector tubes $T_1$ and $T_2$, the basic principles underlying the operation of correlators in the context of stereo-photgrammetric instruments will first be briefly reviewed.

In a stereo instrument, after the pictorial information from a stereo pair has been converted by a scanning action into two video signals, the amount of parallax is determined by comparing these signals. The scanning operation acts to convert the spatial positions of changing photographic densities encountered in the scan path, to a time sequence of electrical signals.

Referring now to FIG. 8, there is shown in highly simplified form, a processed, quantized video signal from image dissector-tube $T_1$ in the course of a single scan in the X direction on diapositive $D_1$. Below video signal A, there is shown the corresponding processed, quantized video signal B from image-dissector tube $T_2$ produced in the course of a concurrent scan in the same direction on diapositive $D_2$.

It will be seen that parallax exists between the image areas covered by the two scans, for in the video A signal the image is farther left than its conjugate in the video B signal representing the corresponding image. As a result, the image information from scanner $T_2$ will be generated at a later time than that from scanner $T_1$, assuming that the respective scans move from left to right synchronously.

Thus a constant time delay D exists between the two video signals. The function of the correlator circuit is to automatically find the time difference. From a knowledge of this time difference D and the velocity V of the scan, parallax is determined by the eqaution: $X = DV$; wherein X is the parallax. A preferred form of signal processor is disclosed in the Altman U.S. Pat. No. 3,593,286.

A more detailed discussion of the function and structure of various types of commercially available correlators for photogrammetric applications may be found in Chapter XV "Automation of Stereocompilation" in the Manual of Photogrammetry—third Edition, Volume II, published by the American Society of Photogrammetry.

Referring now to FIG. 8, a preferred embodiment of the correlator COR for an automated stereo photogrammetric system is illustrated in block form. The correlator in accordance with the invention is composed of two sections, both of which are responsive to the same video signals A and B generated by image dissector tubes $T_1$ $T_2$. The lower section in FIG. 9 functions to effect "coarse" control and the upper section to effect "fine control."

In practice, two rather than one pair of tubes $T_1$ and $T_2$ may be used in conjunction with the stereo pair, one pair of tubes functioning in connection with coarse section and the other pair with the fine section.

The image dissector tubes $T_1$ and $T_2$ operate to scan overlapping areas of the stereo diapositions $D_1$ and $D_2$ to produce video signals A and B. In the present invention, the scanning is carried out by sweep voltages applied only to the horizontal deflection coils 45 of tubes $T_1$ and $T_2$ to effect scanning exclusively in the X direction. These sweep voltages are applied by coil driver amplifier $45D_1$ to the horizontal deflection coil 45 of tube $T_1$ and by coil driver amplifier $45D_2$ to the horizontal deflection coil 45 of tube $T_2$.

The video signals A and B yielded by tubes $T_1$ and $T_2$ represent the varying photographic densities of the scanned areas and constitute the input signals to the coarse and fine control sections of the correlator.

Video signals A and B are fed into two separate channels in the low-frequency coarse control section of the correlator. The first channel comprises a low-frequency band-pass filter 47, followed by a video signal processor 48. The video signal processor functions to normalize the level of the video signal with respect to a reference and then to quantize the level by zero-crossing detector circuitry.

The second channel comprises a low-frequency band-pass filter 49 followed by a video signal processor 50. The outputs of channel processors 48 and 50 are applied to a full scan video processor 51 which yields a "coarse" anamorph error signal 52, a "coarse" X displacement error signal 53 and a "coarse" correlation level signal 54. Displacement error signal 53 is applied, after integration, to coil drive $46D_1$ for tube $T_1$ to control the gross size and position of the scan therein. In practice, full scan signal processor 51 may be of the type illustrated in FIGS. 14 of the above-identified Altman patent.

The fine correction of the position and size of selected small portions of the scan is effected by the high-frequency fine control section of the correlator. In this fine control section, video signals A and B are fed into separate channels. The first channel comprises an electronic switch 55, followed by a high-frequency band-pass filter 56 and a video signal processor 57. The second channel comprises an electronic switch 58, followed by a high-frequency band-pass filter 59 and a video signal processor 60.

The outputs of channel processors 57 and 60 are fed to high resolution signal processor 61, whose circuit may be essentially the same as that of signal processor 51. This high resolution processor yields, for the selected portions of the scan, a "fine" anamorph error signal 62, a "fine" X displacement error signal 63 and a "fine" correlation level signal 64. The fine X error signal 62, after integration, effects fine correction of the selected portion of the scan.

The coarse anamorph error signal 52 from full scan processor 51, after suitable integration in integrator stage 65, is fed as the first input to a summing amplifier 66. The second input to the summing amplifier is the fine anamorph error signal 62, which after integration in stage 64, is fed to the amplifier through an electronic switch 68. The third input to summing amplifier 66 is the fine X error signal 63 after integration in stage 69, the output of this stage being fed to the amplifier through electronic switch 70.

Thus the output of summing amplifier 66, when switches 68 and 70 are operative, is a modifying voltage MV whose value is the sum of the integrated coarse and fine anamorph correction signals and the integrated fine X error signal.

Before considering the effect of this modifying voltage on the scanning action, we shall first examine the nature of the sweep generators for applying sweep voltages to the horizontal scanning coils 45 of image-dissector tubes $T_1$ and $T_2$. This scanning system is synchronized by a clock 71 which generates at a predetermined periodic rate, a square wave SW. This square wave, shown separately in line A of FIG. 10, serves as the basic timing wave form for the sweep of the system.

Square wave SW is applied to a simple integrating amplifier 72 to produce a triangular sawtooth sweep voltage SS at the same rate. Sweep voltage SS is shown at line D of FIG. 10. The sawtooth sweep voltage is applied to coil driver amplifier $45D_2$ for image-dissector tube $T_2$, as a consequence of which the electron beam is caused to scan in a single line, back and fourth in the X direction at a velocity V determined by the slope of the sawtooth.

In each full cycle of the sawtooth voltage, the upward slope of the positive-going half cycle determines the rate of the forward stroke in the scan line, whereas the downward slope of the negative-going half cycle determines the rate of the retrace or return stroke.

The square wave SW from clock 71 is also applied to an integrating amplifier 73 which, in the absence of the modifying voltage MV from summing amplifier 66, produces a sawtooth sweep voltage identical to sweep voltage 55 yielded by integrating amplifier 72. The output of integrating amplifier 73 goes to coil driver $45D_1$ for coil 45 of tube $T_1$. Also applied to coil driver $45D_1$ os the "coarse" X error signal from the full scan signal processor 51, this error signal being integrated in stage 75.

If there were no fine and anamorph corrections, both tubes $T_1$ and $T_2$ would be driven by sawtooth sweep voltages having identical forms. However, with a highly convoluted terrain it becomes possible for an operator using the manual controls 74a and 74b available on an enabling pulse generator 74 to choose the positions and the width of the switching pulse SPA train shown in line B of FIG. 10. The resultant corrected sawtooth sweep voltage applied to coil driver $45D_1$ is shown as waveform MSS on line E of FIG. 10.

The switching pulse train SPA is applied to actuate gating switches 55 and 58 in the respective channels of the fine control section. During the pulse periods of switching pulse train SPA, switches 55 and 58 are enabled so that high-frequency information contained in video signals A and B can be processed. From this information, voltages are generated by the high-resolution signal processor 61 indicating the difference in size and position of the small selected portion of the area scanned.

The fine anamorph signal 62 in the output of the high-resolution signal processor 61 indicates the differences in scale of the area examined during the time chosen by switching pulse train SPA. Switch 68 interposed between integrator stage 67 and summing amplifier 66, serves to pass the integrated fine anamorph signal 62 to one input of the summing amplifier during the periods of the enabling pulses in pulse train SPA.

Similarly, the fine error correction signal 63 indicates the X displacement that is found in the chosen area examined. Switch 70 interposed between integrator 69 and summing amplifier 66 serves to pass the integrated fine error signal 63 to another input of the summing amplifier during the periods of the enabling pulses in pulse train SPE.

Assuming that the switching pulses SPA and SPE are enabling when they are positive and are disabling when they are negative, it will be evident that the fine X error correction signal, in integrated form, is fed into an input of the summing amplifier 66 at the beginning of a full scan period. Thus the input desired from the fine X error correction signal controls the slope of modified sweep voltage MSS (FIG. 10E) from its point of initiation until the start of the time period chosen manually for fine examination of the image.

This correction assures that the fine portion of the sweep MSS (i.e., the part which takes place during the enabling process of pulse train SPA) starts on the same fine portion of the two images. The fine anamorph signal 62 controls the slope of the seep during the enabling period defined by pulse train SPA. This then controls the terrain slope correction during the period of the time of examination of the high-frequency information.

The average slope of sweep voltage MSS and its start and end points are controlled by the anamorph correction input to the summing amplifier 66 and the X correction input to the coil driver obtained by integrating the coarse anamorph error signal 52 and the coarse X error signal 53, respectively. Thus the result of this correction of the basic sawtooth sweep voltage SS is the corrected sweep voltage MSS shown in FIG. 10E in which the conditions imposed for proper scanning of a terrain section shown in FIG. 2 are met.

The result of the summation process is therefore the wave from MSS which has gross scale corrections combined with fine corrections in order to compensate for a highly convoluted terrain sample, such as that shown in FIG. 2. The variation in the scale of the scan, which is generated piece-by-piece, makes possible a simple linear scanner incorporating only such controls as are necessary to generate correction signals when examining terrain features such as those illustrated in FIG. 2.

In particular, the fine displacement and anamorph control insure proper correlation over the small region selected for examination on this terrain area. This is the region defined by the position of the fine enabling pulse train SPA as set by the manual controls on enabling pulse generator 74 for position and desired width.

The high resolution fine control section is very similar electrically to the full scan coarse control section, save for the presence of electronic gating switches 55 and 58 which select that portion of video signals A and B developed by scanning tube $T_1$ which is to be subjected to higher resolution processing. Thus the high resolution section affords correlation and anamorph correction information for that portion of the scan generated during the period represented by a pluse in pulse train SPA.

The fine correlation level signal 64 yielded by high-resolution signal processor 61 indicates the quality of correlation obtained during the period of fine correlation examination defined by the enabling pulses of pulse train SPA. The full scan signal processor 51 provides a correlation level voltages 54 indicative of the quality of correlation throughout the entire scan. The correlation level voltage 54 is available for use in controlling search mode operation and for indicating situations in which the correlator "gets lost."

The main distinction between the present invention and prior art automated stereo systems is that scanning is carried out in one dimension only, essentially the X-direction. Hence displacement and scale change information are processed only with respect to this direction. This considerably simplifies the development of the scan as well as the processing of information generated by the scanning action.

But the simplification obtained by scanning in one direction only is not at the expense of system efficacy, for other important advantages are gained thereby when using an image-dissector tube as the scanning means.

In prior U.S. Pat. No. 3,593,286, a pattern recognition system is disclosed in which images are scanned by an image-dissector tube. This patent points out the desirability of effectively enlarging the aperture. These advantages are also valid in photogrammetric applications. However in this prior patent, in order effectively to elongate the aperture, high-frequency modulation is entailed to oscillate the scanning beam laterally as it is being swept along an annular scanning path. This markedly reduces the amount of dwell time allowed on any individual portion of the image being scanned, thereby reducing the available photon count and the resultant signal-to-noise ratio of the system.

In the present invention, there is no need to modulate the scanning voltage in order effectively to elongate and thereby enlarge the aperture. Since the scan is continuously in one dimension, it becomes possible to mechanically shape the aperture and thereby not only achieve a less complex electronic configuration, but also a system of much greater efficiency in its photon gatherability.

In an image-dissector tube in accordance with the invention, the aperture MA in the anode plane, as shown in FIG. 11, is so formed that it is relatively narrow in the X dimension and relatively long in the Y dimension. Dimensions as great as 5 mm in the Y direction and as small as 0.1 mm in the X direction may be used.

This 5 mm by 0.1 mm aperture which is achieved by mechanically shaping the actual physical hole in the deflectable photomultiplier aperture plate has the resolution of a round aperture of 0.1 mm diameter scanning in the X direction, but it affords a 50 X improvement in photon collection, as compared to a system using a 0.1 mm round aperture electronically-modulated in the manner disclosed in the above-identified patent to simulate a 5mm × 0.1 slit.

It is to be understood that the use of a single enabling pulse in the course of each scan cycle, as shown in FIG. 10A, is by way of illustration only and is not intended as a limitation on the invention. One may in practice advantageously select several enabling pulses which would process several small sections of the scan simultaneously and thereby provide higher order corrections of the wave form MSS shown in FIG. 10E, with a processing channel for each pulse.

Such simultaneous processing has a number of significant advantages. Thus it becomes possible to draw several high resolution profiles of the terrain simultaneously, one such profile being drawn for each enabling pulse. One set of such simultaneously generated profiles can be used to sense the presence of an isolated sharp variation in the terrain configuration, such as would indicate the presence of a house, a tall tree, or other abrupt variation.

Consequently, the process of "majority voting," it would be possible to determine the profile of the terrain itself and not the features sticking up from it when these are isolated aspects of the terrain. There are many instances where profiling of this sort would be highly valuable.

In summary, the correlator system according to the invention is capable of automatically profiling a photogrammetric geometric model to extract not only profile information but the additional information of terrain-slope in the X direction. This terrain-slope information can be used, for example, as an addition to the profile in coordinates X, Y and Z and in the generation of an orthophotograph in order to eliminate residual errors arising from terrain slope.

The system according to the invention is capable of operating much faster than any existing system, in part because of the simplicity of the scan. Scan rates as high as 100,000 scans per second are relatively easy to generate. It is now feasible to produce a scan which projects into the photograph at about 1 to 2 mm in the Y dimension and in the order of 10 to 15 mm in the X direction. With this type of scan size and scan rate, one can correlate and correct the scan to an extraordinary degree of accuracy while moving the scan relative to the photographic plate approximately one-half mm per 10 scan periods or 5,000 mm/sec. This is approximately 100 times faster than any system heretofore developed.

It is of course not possible to implement a precision mechanical system for movement at this exceptional rate without a loss of mechanical precision. But for the first time in photogrammetric technology, limitations on profiling are not imposed by the speed of the processing but rather by the ultimate speed at which it is feasible to generate precise mechanical movements.

There are also the benefits which flow from being able to position the scan grossly by the use of information generated in the low frequency coarse control section. This reduces the likelihood of the scan's "getting lost," a very common failing in conventional correlator-controlled systems, particularly those used in photogrammetric applications.

Heretofore it was always necessary to compromise between the use of a large scan to prevent getting lost and the resolution obtainable only from a small scan. In the present invention, one factor is not sacrificed at the expense of the other. The reason for this is that the major portion of the scan which is processed through the coarse control section is used to assure that the scan does not get lost even under somewhat violent terrain convolutions, whereas the actual information for high precision profiling is generated from the high-frequency information examined during a small portion of the scan.

In correlator system in accordance with the invention, should the fine scan get lost, an automatic electronic high-speed search mode may be initiated to reestablish correlation. Because of the high speed of this search technique, the mechanical profiling is not significantly interrupted.

In addition, the ability to carry out parallel processing is unique to the present invention; that is, the ability to draw multiple profiles and to make use of them in the most convenient fashion, either to improve the processing speed of the system without having to move the mechanical system much faster, or to make use of the majority-vote technique to sense and correct the profile for the presence of isolated houses, trees, etc.

It will be appreciated that a small portion of the scan can be extracted at a higher magnification by a physically separate scanning system via beam splitters instead of the integral fine-scan system disclosed hereinabove. The function and operation of the separate system are essentially the same as those in the integral system disclosed herein.

While there have been shown and described, preferred embodiments of an automated stereo-photogrammetric instrument in accordance with the invention, it will be obvious that many changes and modifications may be made therein without departing from the essential spirit of the invention as set forth in the annexed claims.

I claim:

1. In a photogrammetric system adapted to observe conjugate areas for the purpose of measuring X-parallax in a pair of photographs taken from separate spaced positions, the combination comprising:
   A. means to scan each of said photographs along an epipolar ray in which X-parallax is present and in which Y-parallax and image rotation are substantially absent, to produce first and second video signals representative of the scanned path on said photographs, and
   B. means to apply said first and second signals to a correlator to produce an output value reflecting the value of X-parallax.

2. The combination set forth in claim 1, wherein said correlator includes means to derive from said video signals an output reflecting the value of X slope.

3. In a system as set forth in claim 1, wherein said means to scan each of said photographs along an epipolar ray include a scanner having a sensitive face, optical means to project an image of said photograph onto said face, and optical means to rotate the projected image to cause the scanner to scan along said epipolar ray.

4. In a system as set forth in claim 1, wherein said means to scan each of said photographs along an epipolar ray include a scanner having a sensitive face, optical means to project an image of said photograph onto said face, and electronic means coupled to said scanner to rotate the scan thereof to cause the scan to scan said epipolar ray.

5. In an automated stereo-photogrammetric system adapted to observe conjugate areas in a stereo-pair of photographs for the purpose of determining X-parallax, the combination comprising:
   A. first and second scanners, each observing a respective photograph,
   B. a first sweep generator coupled to the first of said scanners to produce a single line scanning pattern which lies in an epipolar ray whereby said first scanner produces a video signal representing the varying photographic densities in the scanned path on one of said photographs,
   C. a second sweep generator coupled to the second scanner to produce a single-line scanning pattern which lies in an epipolar ray whereby said second scanner produces a video signal representing the varying photographic densities in the corresponding scanned path on the other of said photographs, D. an electronic correlator responsive to the first and second video signals to produce an output value reflecting the degree of similarity between the first and second video signals and correction values, indicative of the sense of the correction necessary to enhance said similarity, and E. means responsive to said correction values to modify the sweep produced by at least one of said generators to an extent causing an enhancement in the degree of similarity of said first and second video signals.

6. An automated photogrammetric system as set forth in claim 5, wherein said scanners are image-dissector tubes, lens means being provided to project illuminated images of portions of said photographs onto a photocathode whose photoelectrons are focused on an anode having an aperture which is an elongated slit form whose long dimension is at right angles to said single-line scanning pattern, each image-dissector tube being provided with deflection means coupled to a respective sweep generator.

7. An automated photogrammetric system as set forth in claim 5, wherein said sweep generators for producing a single-line scanning pattern are constituted by a clock producing a square wave which is applied to first and second integrating amplifiers to convert the square wave into triangular sawtooth sweep voltages for said first and second scanners.

8. An automated photogrammetric system as set forth in claim 5, wherein said photographs are diapositives mounted on a common carriage and are illuminated to produce images on the surface of the system scanners.

9. An automated photogrammetric system as set forth in claim 8, further including a servo system coupled to said correlator and adapted to shift one of said photographs relative to the other in a direction and to an extent causing said video signals to approach a condition of identicality.

10. In an automated photogrammetric system as set forth in claim 5, wherein said correlator is provided with a full scan coarse control section responsive to said first and second video signals to effect low-order correction causing said signals to approach a condition of identicality, and having a fine control section responsive to the same signals operative for only a small portion of the full scan to effect a higher order of correction.

11. In an automated photogrammetric system as set forth in claim 10, further including manually-adjustable means associated with said fine control section to effect a higher order of correction for a selected small portion of the scanning pattern.

12. In a system as set forth in claim 10, wherein said coarse control section includes two low-frequency channels responsive to said first and second video signals, each channel including a low-pass filter followed by a video processor, the outputs of the video processors of the two channels being fed to a full-scan processor to produce an anamorph error signal and a displacement error signal.

13. In a system as set forth in claim 12, wherein said full-scan processor also produces a correlation level signal.

14. In a system as set forth in claim 12, wherein said anamorph error signal and said displacement error signal are both integrated to produce a voltage modifying the sweep voltage from at least one of said generators to effect said low-order correction.

15. The combination as set forth in claim 10, wherein each section operates in cooperation with a separate pair of tubes.

16. The combination as set forth in claim 10, wherein said photographs are diapositives.

17. The combination as set forth in claim 10, wherein said photographs are negatives.

18. In an automated stero-photogrammetric system adapted to observe conjugate areas in a stereo-pair of diapositives for the purpose of determining X-parallax, the combination comprising:

A. first and second image-dissector tubes each observing a respective diapositive, each tube including a magnetic deflection coil adapted to deflect the electron trajectory between a photocathode and a defining aperture in an anode in a given direction, B. first and second sweep voltage generators coupled to respective deflection coils of said first and second tubes to produce single-line scanning patterns which lie in epipolar rays whereby said first tube produces a first video signal representative of the varying photographic densities of one of said diapositives in a scanned path, and said second tube produces a second video signal representative of the varying photographic densities of the other diapositive in a corresponding scanned path, C. an electronic correlator responsive to said first and second video signals to produce an output value reflecting the degree of similarity between the video signals and correction values indicative of the sense of the corrections necessary to enhance said similarity, and D. means responsive to said correction value to modify the sweep voltage produced by at least one of said generators and/or the position of at least one of the diapositives to an extent causing said first and second video signals to enhance the degree of similarity.

19. In a system as set forth in claim 18, wherein said correlator includes a coarse control section and a fine control section, said coarse control section being provided with two separate channels responsive to the respective video signals, each including a low-frequency band-pass filter and a signal processor to quantize the applied video signal, the signal processors of said coarse control channels being coupled to a signal processor producing a coarse anamorph error signal and a coarse displacement error signal; said fine control section being provided with two separate channels responsive to the respective video signals, each including a high-frequency band-pass filter and a signal processor producing a fine anamorph error signal and a fine displacement error signal, a summing amplifier having three inputs, one of which is the integrated value of said coarse anamorph error signal, the second of which is the integrated value of said fine anamorph error signal, the third of which is the integrated value of said fine displacement error signal, said summing amplifier producing a modifying voltage which is applied to at least one of said sweep generators to provide a higher order of correction to effect identicality.

20. In a system set forth in claim 19 further including electronic switching means to render said fine control section effective for a small portion of the full scan, said switching means having manual controls to select the position and width of said small portion.

* * * * *

UNITED STATES PATENT OFFICE
CERTIFICATE OF CORRECTION

Patent No. 3,783,294     Dated January 1, 1974

Inventor(s)  Robert Koper

It is certified that error appears in the above-identified patent and that said Letters Patent are hereby corrected as shown below:

Column 1, line 28 "obstraction" should have read
         -- abstraction --
Column 2, line 27, after "Photogrammetry," -- 1966, pgs.
         20 -23 -- should have been inserted.
Column 4, line 66 "having" should have read -- using --
Column 5, line 23 "ad" should have read -- and --
         line 31 "integrqtion" should have read -- integration--
Column 7, line 25 "corrdinates" should have read -- coordinates--
         line 27 "Orthopholograph" should have read
              -- Orthophotograph --
         line 34 "maner" should have read -- manner --
Column 9, line 23 after "scans" the word -- lie -- should appear.
Column 11, line 21 "THe" should have read -- The --
Column 15, line 12 "1'" second instance, should have read
         -- 1" --
Column 18, line 17 "stereo photogrammetic" should be deleted.
         line 61 "8" should have read -- 9 --
Column 20, line 39 "os" should have read -- is --
Column 21, line 24 "seep" should have read -- sweep --
         line 35 "of" should have read -- on --
         line 40 "from" should have read -- form --
Column 22, line 2 "voltages" should have read -- voltage --
         line 55 "0.1 slit" should have read -- 0.1mm slit --
Column 23, line 7 "the" should have read -- by a --
         line 62 "In correlator" should have read
              -- In a correlator --

UNITED STATES PATENT OFFICE
CERTIFICATE OF CORRECTION

Patent No. 3,783,294                     Dated January 1, 1974

Inventor(s)   Robert Koper                         Page - 2

It is certified that error appears in the above-identified patent and that said Letters Patent are hereby corrected as shown below:

Column 1, line 51 "modles" should have read -- models --
Column 3, line 57 "magintude" should have read
            -- magnitude --
Column 7, line 26 "coodinates" should have read
            -- coordinates --
Column 7, line 39 "dispalacement" should have read
            -- displacement --
Column 9, line 12 "mulitplier" should have read
            -- multiplier --
Column 18, line 21 "stereo-photgrammetric" should have read
            -- stereo-photogrammetric --
Column 18, line 51 "eqaution" should have read -- equation --
Column 21, line 63 "pluse" should have read -- pulse --

Signed and sealed this 21st day of May 1974.

(SEAL)
Attest:

EDWARD M. FLETCHER, JR.                C. MARSHALL DANN
Attesting Officer                      Commissioner of Patents